April 29, 1969     J. P. MERKE, JR     3,441,254
MOLDED PLASTIC IMPELLER FOR MIXING MACHINE
Filed Aug. 4, 1967
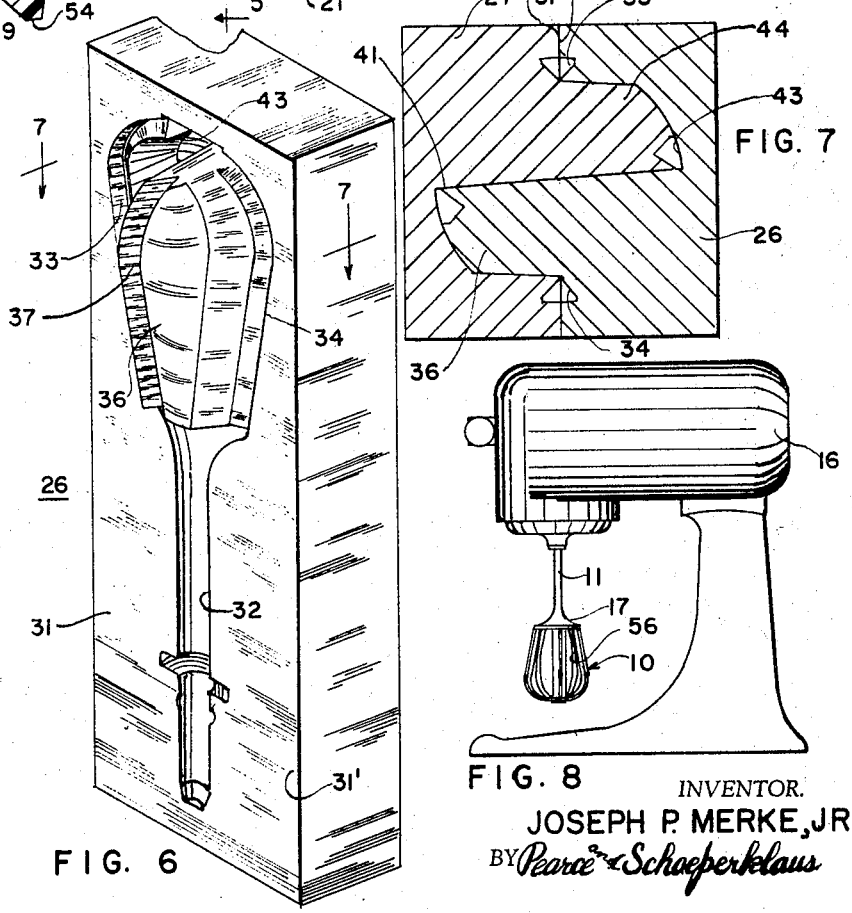
INVENTOR.
JOSEPH P. MERKE, JR.
BY Pearce & Schaeperklaus
Attorneys United States Patent Office 3,441,254
Patented Apr. 29, 1969

3,441,254
MOLDED PLASTIC IMPELLER FOR MIXING MACHINE
Joseph P. Merke, Jr., Green Township, Hamilton County, Ohio, assignor to The Plastic Moldings Corporation, Cincinnati, Ohio, a corporation of Ohio
Filed Aug. 4, 1967, Ser. No. 658,554
Int. Cl. B01f 7/16; B29c 3/00, 5/12
U.S. Cl. 259—134      3 Claims

ABSTRACT OF THE DISCLOSURE

A molded plastic impeller for a mixing machine in which blade vanes are off-set so that the impeller can be molded between a pair of mold halves.

This invention relates to mixing machines. More particularly, this invention relates to the construction of impellers for mixing machines.

An object of this invention is to provide a plastic impeller for a mixing machine.

A further object of this invention is to provide a plastic impeller which can be molded between a pair of mold halves.

Briefly, this invention provides a one-piece molded impeller for a mixing machine having four resilient blades which can cooperate with a second four-bladed impeller to provide a mixing action. Two of the impeller blades are diametrically opposed. The other two of the impeller blades are disposed on opposite sides of a diameter normal to the plane of the first two of the impeller blades so that the impeller can be molded between mold halves which part on the plane of the first two of the impeller blades.

The above and other objects of the invention will be apparent to those skilled in the art to which this invention pertains from the following detailed description, and the drawing, in which:

FIG. 1 is a bottom plan view of a mixer impeller constructed in accordance with an embodiment of this invention;

FIG. 2 is a view in front elevation of the impeller shown in FIG. 1;

FIG. 3 is a view in side elevation of the impeller shown in FIGS. 1 and 2;

FIG. 4 is a view in section taken on the line 4—4 in FIG. 2;

FIG. 5 is a view in section taken on the line 5—5 in FIG. 3;

FIG. 6 is a perspective view of a mold half used in forming the impeller, gates being omitted for clarity;

FIG. 7 is a view in transverse section through the mold half shown in FIG. 6 and a second mold half which cooperates therewith; and FIG. 8 is a view in side elevation of a mixer including impeller blades of the form shown in FIGS. 1 to 3 inclusive.

In the following detailed description, and the drawing, like reference characters indicate like parts.

In FIGS. 1 to 3 inclusive is shown a one-piece molded plastic impeller 10 constructed in accordance with an embodiment of this invention. The impeller includes a stem 11 having an upper portion 12 (FIGS. 2 and 3) provided with an outwardly extending annular flange 13 and outwardly extending lugs 14, which can be of usual form and which cooperate with a mixing machine 16 (FIG. 8) for mounting the impeller therein.

The lower portion of the stem 11 terminates in an outwardly extending portion 17 which supports upper ends of impeller blades 18, 19, 20 and 21. Lower ends of the blades join at a central portion or boss 23 aligned with the stem.

As shown in FIG. 1, the blades 18 and 20 are diametrically opposed and are substantially co-planar. The blades 19 and 21, on the other hand, are disposed on opposite sides of a diametral plane A—A, which is perpendicular to the plane of the blades 18 and 20.

The impeller is molded between mold halves 26 and 27 (FIG. 7). As shown in FIG. 6, the mold half 26 includes a body 31 having a face 31' in which grooves 32, 33, 34 are formed complementary to half portions of the stem 11 and blades 20 and 18, respectively. In addition, the mold half 26 includes an outwardly extending rib 36 having a groove 37 therein complementary to faces 38 and 39 (FIG. 5) of the blade 21.

The other mold half 27 is of generally similar construction and has face 40 which mates with the face 31' of the mold half 26. The mold half 27 has a slot 41 (FIG. 7) which receives the rib 36 as shown in FIG. 7. Similarly the mold half 26 has a slot 43 into which a rib 44 of the mold half 27 fits. Appropriate gates, not shown, can be formed in the mold halves for introduction of plastic therein.

The cross-section of the blades 20 and 21 is shown in FIGS. 4 and 5, respectively. The blades are so formed that the mold halves can be advanced into position for molding the blades and can be retracted from the blades after molding. Outer faces 46 and 47 of the blades 20 and 21 respectively are formed on a common circle as shown in FIG. 1 and the blades are substantially equally spaced, radially, from the axis of the stem. As shown in FIG. 4, inner faces 48 and 49 of the blade 20 intersect at an acute angle. The outer face 46 does not intersect the inner faces 48 and 49 but is separated therefrom by narrow edge faces 51 and 52, respectively. Similarly, the outer face 47 (FIG. 5) of the blade 21 is separated from inner faces 38 and 39 thereof by edge faces 53 and 54, respectively.

The blades can be molded of appropriate plastic material such as one of the resilient plastics known as nylon or Delrin. Two of the impellers molded between the mold halves can be mounted in the mixing machine 16 as shown in FIG. 8, the second impeller being indicated at 56, and the impellers can intermesh in the usual fashion. Since the impellers are formed of resilient plastic, the blades are not injured if an article or an operator's hand or fingers come between blades, and the blades can bend sufficiently to permit the fingers or article to pass therebetween.

The impeller construction illustrated in the drawing and described above is subject to structural modification without departing from the spirit and scope of the appended claims.

Having described my invention, what I claim as new and desire to secure by Letters Patent is:

1. A one-piece molded impeller for a mixer which includes a stem, four strip agitator blades extending integrally from the stem and integrally connected together at a location remote from said stem, each of said blades extending along and outwardly from the axis of the stem, the axis being open opposite the blades, a first pair of the blades being diametrically opposed and substantially co-planar, the second pair of blades extending substantially perpendicularly to and being disposed adjacent and on opposite sides of a diametrical plane perpendicular to the plane of the first pair.

2. An impeller as in claim 1 wherein the blades are substantially equally spaced radially from the axis of the stem.

3. An impeller as in claim 1 wherein the ends of the blades remote from the stem are attached together by a boss portion in alignment with the axis of the stem.

References Cited

UNITED STATES PATENTS

| | | | |
|---|---|---|---|
| 570,662 | 11/1896 | Cormack | 259—134 |
| 2,063,692 | 12/1936 | Martinet | 259—84 |
| 3,328,005 | 6/1967 | McMaster et al. | 259—131 XR |

FOREIGN PATENTS 670,642  4/1952  Great Britain.

WALTER A. SCHEEL, *Primary Examiner.*

JOHN M. BELL, *Assistant Examiner.*

U.S. Cl. X.R.

18—42